US012737212B2

(12) United States Patent
Jugel et al.

(10) Patent No.: US 12,737,212 B2
(45) Date of Patent: Sep. 15, 2026

(54) DYNAMIC PARAMETER REPLACEMENT

(71) Applicant: SAP SE, Walldorf (DE)

(72) Inventors: Kay Jugel, Dresden (DE); Ronny Pahlke, Dresden (DE)

(73) Assignee: SAP SE, Walldorf (DE)

( * ) Notice: Subject to any disclaimer, the term of this patent is extended or adjusted under 35 U.S.C. 154(b) by 461 days.

(21) Appl. No.: 18/500,873

(22) Filed: Nov. 2, 2023

(65) Prior Publication Data

US 2025/0147785 A1 May 8, 2025

(51) Int. Cl.
*G06F 9/455* (2018.01)

(52) U.S. Cl.
CPC ................................ *G06F 9/45558* (2013.01)

(58) Field of Classification Search
CPC ......................... G06F 9/45558; G06F 9/44505
USPC ............................................................. 718/1
See application file for complete search history.

(56) References Cited

U.S. PATENT DOCUMENTS 6,851,087 B1 * 2/2005 Sibert ................... G06F 40/174 715/236
10,599,487 B1 * 3/2020 Goodwin ................ G06F 16/22
10,645,158 B1 * 5/2020 Ippatapu ............... G06F 3/0683
10,680,891 B2 * 6/2020 Thomasson ............. H04L 41/12
11,036,933 B2 * 6/2021 Shah ....................... H04L 67/02
11,277,303 B1 * 3/2022 Srinivasan .......... G06F 16/9035
11,308,281 B1 * 4/2022 Craft ..................... G06F 40/284
2002/0055849 A1 * 5/2002 Georgakopoulos .... G06Q 10/06 717/102
2005/0193040 A1 * 9/2005 Adiba ................. G06F 16/2219
2006/0282460 A1 * 12/2006 Pandya ................... G06F 9/541
2007/0233717 A1 * 10/2007 Prabhakar ................. G06F 8/61
2007/0276649 A1 * 11/2007 Schubert ............... G06F 40/157 704/2
2008/0097974 A1 * 4/2008 Chen ..................... G06F 16/832
2010/0070062 A1 * 3/2010 Fontanot ................ G06Q 10/06 700/100
2011/0021179 A1 * 1/2011 Montz ............... H04M 3/42144 455/414.1
2011/0314451 A1 * 12/2011 Baumann ............ G06F 9/44526 717/136
2012/0143873 A1 * 6/2012 Saadat .................. G06F 16/278 707/741

(Continued)

*Primary Examiner* — Adam Lee
(74) *Attorney, Agent, or Firm* — Fountainhead Law Group, PC

(57) ABSTRACT

Before performing dynamic parameter replacement, an object and a parameter-property mapping are obtained. The object may be an infrastructure template for provisioning physical or virtual computer systems. The object includes a plurality of properties and the plurality of properties include a plurality of placeholders. Each particular placeholder of the plurality of placeholders is a portion of a particular value of a particular property. The parameter-property mapping includes a plurality of key-value pairs where each key value pair includes a property key and a property value. To perform dynamic parameter replacement, the plurality of properties of the object (e.g., infrastructure template) are looped over using generic classes to identify and replace placeholders of the plurality of placeholders which match the property key with the property value.

14 Claims, 5 Drawing Sheets

(56) References Cited

U.S. PATENT DOCUMENTS

2013/0127877 A1* 5/2013 Blas, Jr. .................. G06T 13/00 345/474
2013/0132840 A1* 5/2013 Blas, Jr. .................. G06T 13/00 715/719
2013/0275476 A1* 10/2013 Chandler .......... G06F 16/24539 707/825
2013/0275969 A1* 10/2013 Dimitrov ............ G06F 9/45558 718/1
2014/0013211 A1* 1/2014 Sakata .................. G06F 40/143 715/235
2015/0127880 A1* 5/2015 Felch .................. G06F 16/2455 711/102
2015/0229613 A1* 8/2015 Baum .................. H04L 63/061 713/171
2015/0301840 A1* 10/2015 Goetz ...................... G06F 8/24 717/166
2016/0139914 A1* 5/2016 Levi .................... G06F 11/3604 717/121
2017/0116007 A1* 4/2017 Cimadamore ...... G06F 9/44557
2017/0185403 A1* 6/2017 Anderson ........... G06F 12/0875
2018/0165381 A1* 6/2018 Venkatesh ................. G06F 9/38
2018/0239792 A1* 8/2018 Ting ......................... G06N 7/01
2018/0357234 A1* 12/2018 De ......................... G06F 3/061
2019/0034982 A1* 1/2019 Kulp .................. G06Q 30/0277
2019/0253457 A1* 8/2019 Koul ....................... H04L 63/20
2020/0034350 A1* 1/2020 Moran ...................... G06F 7/08
2020/0151201 A1* 5/2020 Chandrasekhar ........ G06N 5/04
2020/0177534 A1* 6/2020 Kalmady ................ G06F 9/542
2022/0036127 A1* 2/2022 Lin ......................... G06T 11/00
2022/0217188 A1* 7/2022 Sodagar .................. H04L 67/02
2022/0284392 A1* 9/2022 Chandrasekhar .... G06N 3/0464
2022/0321663 A1* 10/2022 Benson ............... H04L 12/2836
2023/0057547 A1* 2/2023 Shah ................... G06F 21/6254
2024/0053995 A1* 2/2024 Kempf .................... G06F 9/451
2024/0220519 A1* 7/2024 Badii .................... G06F 16/235
2025/0139085 A1* 5/2025 Mohammed ......... G06N 3/0455

* cited by examiner

DYNAMIC PARAMETER REPLACEMENT

BACKGROUND

The present disclosure relates to computer infrastructure provisioning and in particular to dynamic parameter for infrastructure templates.

In computer infrastructure provisioning, computer servers, data volumes, mount points, and various other hardware devices and software components are allocated and configured to create an environment for operating a certain software application (e.g., database management, enterprise resource planning, or customer relationship management applications). With the help of an infrastructure template, any software application may be configured for provisioning. To perform infrastructure provisioning, there are procedures containing tasks, which run automations of various kinds, such as for provisioning or decommissioning of customer systems or virtual machines. These procedures may contain numerous parameters, which are used by tasks as input values. Apart from that there may also be a lot of internal data used for determining the task's behavior.

Templates can be used to provision infrastructure for different implementations of the same or similar software applications. An infrastructure template may represent a template containing data of one computer system setup including hardware specifics such as their volume sizes and types, block devices attached as well as application specific like file system, directories and mount points created and so on. The infrastructure template is referred to as a "template" because it may be reused to provision and configure the same infrastructure for different customers or at different sites, for example. These infrastructure templates may contain various data with different properties. Some information may be valid for a group of setups (e.g., all hyperscaler setups) and remain unchanged for a certain number of templates. Other information may change per system setup and hence per infrastructure template.

It is difficult for infrastructure developments and engineers to maintain infrastructure templates for each of the various implementations that are possible. For example, if a new specific system property value is to be added by which the systems must be distinguished, a new and separate infrastructure template may need to be created.

In prior infrastructure provisioning systems, such situations may result in a large number of infrastructure templates and also might require a large maintenance effort to support the templates a more efficient way of maintaining infrastructure templates is needed.

The present disclosure addresses these issue and others, as further described below.

DETAILED DESCRIPTION

Figure 1:
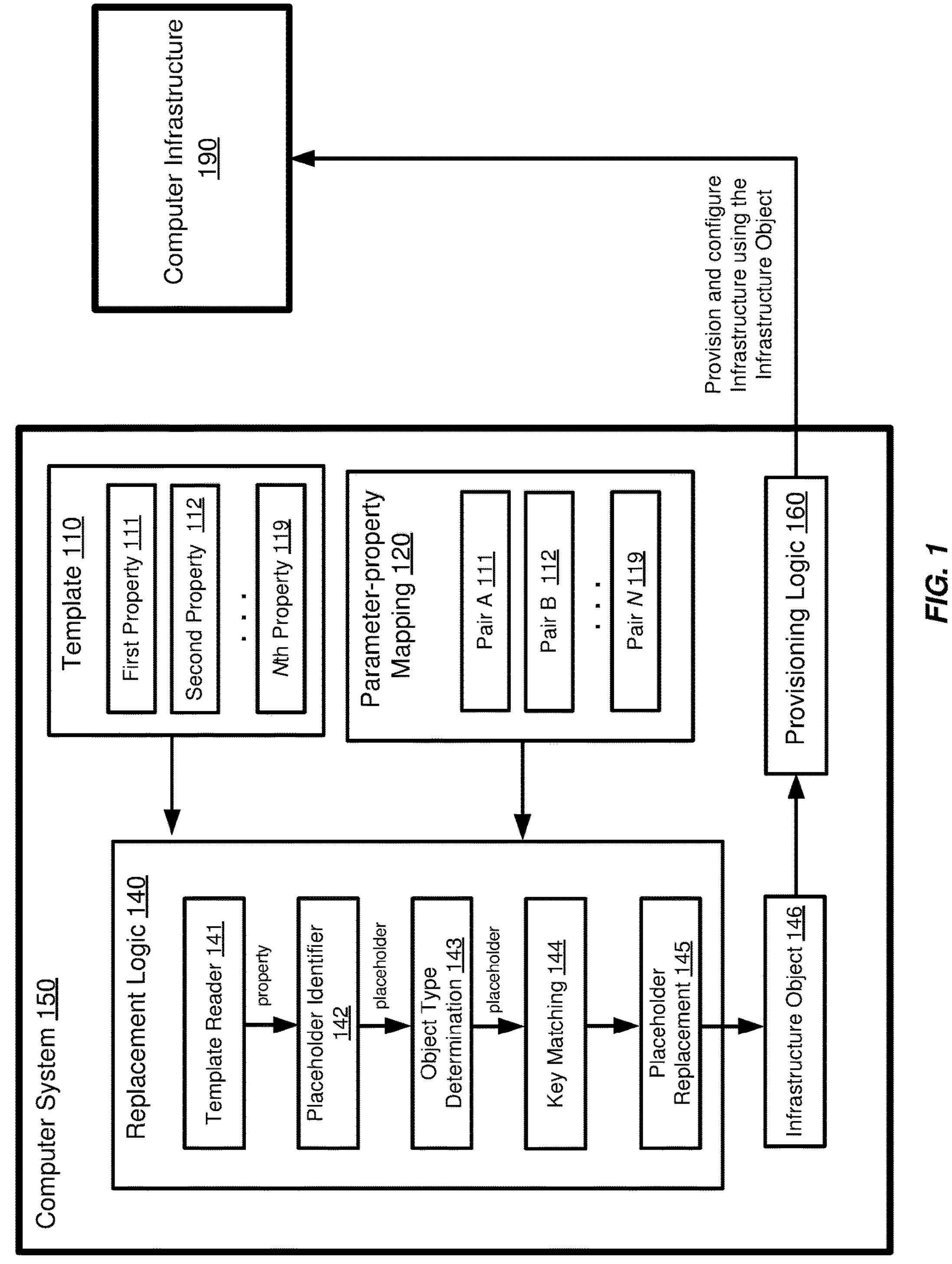
FIG. 1 shows a diagram of a computer system configured to perform dynamic parameter replacement, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated and may instead be used for differentiation between different objects or elements.

As mentioned above, templates can be used to provision infrastructure for different implementations of the same or similar software applications. An infrastructure template may represent a template containing data of one computer system including hardware specifics such as their volume sizes and types, block devices attached as well as application specific like file system, directories and mount points created and so on. These infrastructure templates may contain various data with different properties. Some information may be valid for a group of setups (e.g., all hyperscaler setups) and remain unchanged for a certain number of templates. Other information may change per system setup and hence per infrastructure template.

It may be difficult for infrastructure developments and engineers to maintain infrastructure templates for each of the various different implementations that are possible. For example, if a specific property value is to be added, a new and separate infrastructure template may need to be created. In another example, when new placeholders are added, a new line of code in the replacement logic may be needed for each different possibility for that placeholders, for each of the placeholders.

In prior infrastructure provisioning systems, such situations may result in a large number of infrastructure templates and also might require a large maintenance effort to support the templates. A more efficient way of maintaining infrastructure templates is needed.

One challenge is to balance between flexibility in the templates' replacement logic and the maintenance effort to provide this flexibility. For this reason, specific parts of the infrastructure template's data can be set dynamically. For instance, a virtual hostname does not have to be static but may contain placeholders. For example, the placeholder may be formatted as follows: "vh<SomeID>mm<count>". In this example, "SomeID" and "count" can be replaced with values provided in previously described parameters. The actual value used may then be "vhabcmm01", for example. However, due to the nature of such applications this replacement may not be easy, since parameters may be read at different stages of such processes and may be processed by different levels in the execution layer, so all the data needs to be passed through. Also, such parameters may come in different types (e.g., numerics, strings, enumerations to name a few), which leads to special handling of these types.

FIG. 1 shows a diagram 100 of a computer system 150 configured to perform dynamic parameter replacement, according to an embodiment. The computer system 150 may be a server computer, for example. The computer system 150 may also include a plurality of computer devices working as a system. The computer system 150 may include computer hardware components such as those described below with respect to FIG. 5. In some embodiments, the computer system 150 may be part of a cloud computing platform providing services to one or more customers to run one or more software applications on computer hardware. In other embodiments the computer system 150 may be an on-premise computer system.

As further discussed below, the computer system 150 is configured to provision computer infrastructure 190, including physical and/or virtual computer hardware for operating the software applications, using an infrastructure template 110. The infrastructure template 110 has placeholder values that are replaced using values from a parameter-property mapping 120. The computer system 150 can obtain the template 110 (e.g., from a database or other storage). The infrastructure template including a plurality of properties. In FIG. 1, a first property 111, second property 112, and Nth property 119 are shown with ellipsis ( . . . ) to indicate that any number of properties may be present. The plurality of properties include a plurality of placeholders. Each particular placeholder of the plurality of placeholders may be a portion of a particular value of a particular property. As mentioned above, a placeholder may be formatted "vh<SomeID>mm<count>" where "SomeID" and "count" can be replaced with values.

The values to use for the replacement are provided in a parameter-property mapping 120. The computer system 150 can obtain the parameter-property mapping 120 internally (e.g., from a user) or externally (e.g., from a database). The parameter-property mapping 120 includes a plurality of key-value pairs where each key value pair including a property key and a property value. In FIG. 1, the parameter-property mapping 120 includes Pair A 111, Pair B 112, and Pair N 119 with ellipsis ( . . . ) to indicate that the mapping 120 may include any number of key-value pairs. The parameter-property mapping 120 may be formatted as JavaScript Object Notation (JSON), comma-separated values (CSV), or as a spreadsheet, for example.

The computer system 150 includes replacement logic 140 software that is configured to replace every placeholder in the template 110 with the values of the mapping 120, which may be any possible value. In order to avoid hardcoding the replacement logic (as in certain prior solution), the replacement logic 140 is configured to iteratively loop over each of the plurality of properties of the infrastructure template using generic classes to identify and replace placeholders of the plurality of placeholders which match the property key with the property value.

This approach treats this replacement 140 at a generic level by looping through all parameters provided in a parameter-property-mapping 120. Then it loops over all properties of the template 110 we want to replace something in. This is done generically to be independent of possible changes in the template's class, such as when a new property is added or a type changes. It also allows the replacement logic to be reused for other objects and to traverse type agnostically through object hierarchies. Thus, while infrastructure templates 110 are described here with respect to FIG. 1 and are also described below, the dynamic parameter replacement techniques described herein may be applied to other objects besides infrastructure templates.

Figure 4:
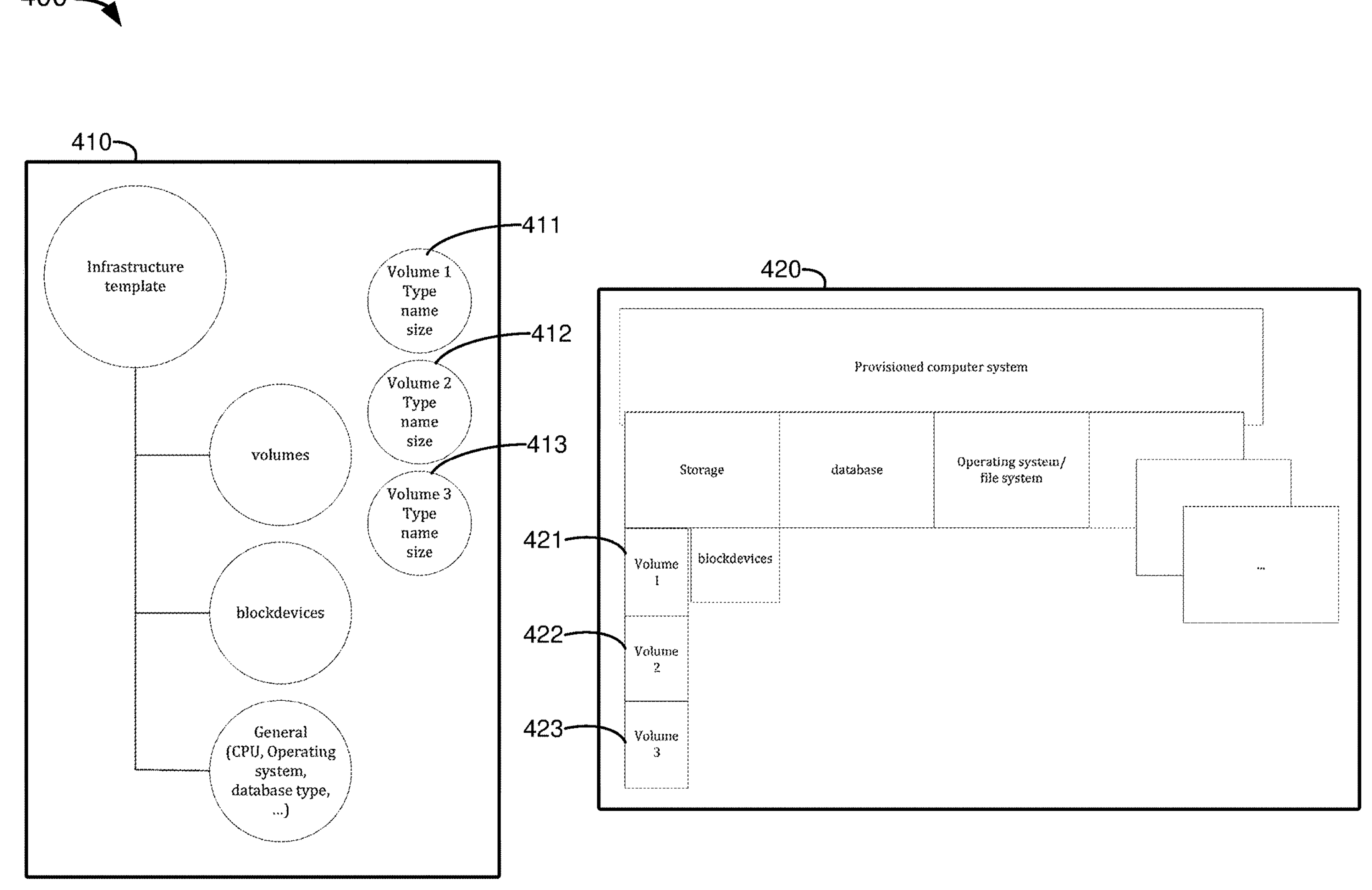
FIG. 4 shows an illustration of portion of an example infrastructure template and corresponding infrastructure, according to an embodiment.

By replacing the placeholder values with the values in the parameter-property mapping 120 the computer system 150 has created an infrastructure object 146. Provisioning logic 160 of the computer system 150 may then take the infrastructure object 146 and use it to provision and configure computer infrastructure 190. An example of an infrastructure object 146 and an example of the corresponding computer infrastructure 190 are shown in FIG. 4.

This dynamic parameter replacement technique are advantageous as they may save a lot of maintenance efforts on both the development as well as the user's side, as fewer adaptations are required if dynamic properties are added or changed. At the same time the plus in flexibility further reduces manual actions due to missing automation for dynamic parameter handling.

One prerequisite may be for the users to provide the parameter to property mapping 120. The easiest way to provide this is a simple key-value table or list provided as JSON or any other format, which is machine-readable.

The replacement logic includes a template reader 141 software component, a placeholder identified 142 software component, an object type determination 143 software component, a key matching 144 software component, and a placeholder replacement 145 software component.

The template reader 141 software component is configured to loop over all properties of the object's class using generics (i.e., reading data at class level).

The placeholder identified 142 software component is configured to identify replacement markers within each property being looped over.

The object type determination 143 software component is configured to determine whether a property is a simple object (as opposed to a complex object). If so, replacement logic 140 may be executed on that object.

The key matching 144 software component is configured to loop over key-value-pairs in the mapping 120 for a replacement-key matching the replacement marker.

In some embodiments if the replacement-key was found, the replacement logic 140 may check data type safety (for instance, check if replacement value is a number for a numeric type). The data type of the parameter value in the mapping may be checked to be compatible the data type of the template property.

The placeholder replacement 145 software component is configured to replace the placeholder marker in the template property with replacement value from mapping 120.

Figure 2:
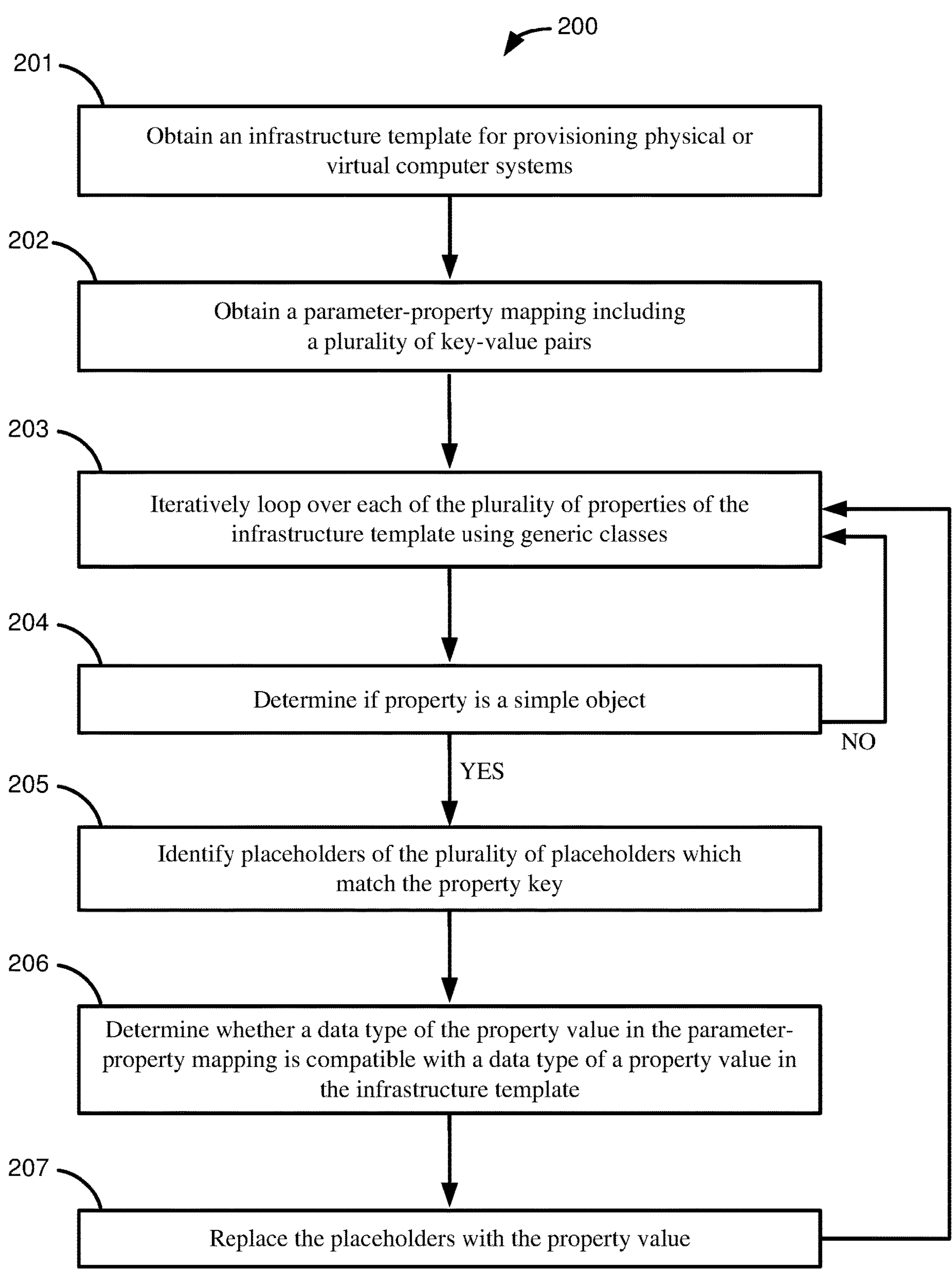
FIG. 2 shows a flowchart of a computer implemented method for perform dynamic parameter replacement, according to an embodiment.

Flowcharts for performing such dynamic parameter replacement are described below with respect to FIG. 2 and FIG. 3. FIG. 2 shows a flowchart 200 of a computer implemented method for performing dynamic parameter replacement, according to an embodiment. The method may be performed by a computer system such as the computer system 150 described above with respect to FIG. 1.

At 201, obtain an infrastructure template for provisioning physical or virtual computer system. The infrastructure template includes a plurality of properties, the plurality of properties including a plurality of placeholders. Each particular placeholder of the plurality of placeholders is a portion of a particular value of a particular property.

At 202, obtain a parameter-property mapping including a plurality of key-value pairs, each key value pair including a property key and a property value.

At 203, iteratively loop over each of the plurality of properties of the infrastructure template using generic classes to identify.

In some embodiments, iteratively looping using generic classes is performed independent of possible changes in the infrastructure template's class, enabling properties to be added or changed without changing the sets of instructions for iteratively looping over each of the plurality of properties of the infrastructure template.

In some embodiments, at 204 the method may determine whether each of the plurality of properties of the infrastructure template is a simple object or a complex object. If the property is not a simple object ("NO" at 204) such that it is a complex object, then the method may return to 203 and iteratively loop over each of the plurality of properties of the complex object using generic classes to identify and replace placeholders of the complex object. If the property is a simple object ("YES" at 204), then the method continues to 205.

At 205, identify placeholders of the plurality of placeholders which match the property key.

In some embodiments, at 206 the method may determine whether a data type of the property value in the parameter-property mapping is compatible with a data type of a property value in the infrastructure template prior to the replacement of a placeholder with the property value of the parameter-property mapping.

At 207, replace placeholders of the plurality of placeholders which match the property key with the property value.

In some embodiments, the parameter-property mapping is a JavaScript Object Notation object.

In some embodiments, the infrastructure template is a template containing data of various setups or configurations of computer systems including one or more of volume size, volume types, block devices, file system, directories, and mount points.

In some embodiments, the generic classes read data at a class level such that a data type of each placeholder is not predetermined.

Thus, by the method described above with respect to FIG. 2, placeholders in an object such as an infrastructure template may be dynamically replaced with corresponding values in a mapping. This technique for placeholder replacement using generics is advantageous as it allows for the object (e.g., template) to be modified without requiring the algorithm designer to put forth new efforts in re-coding the replacement logic to account for the changes to the object.

Example

A method for dynamic parameter replacement was described above with respect to FIG. 2. Now, a more detailed example implementation of the dynamic parameter replacement is described with respect to example pseudo code for the replacement logic along with a flowchart of the replacement logic.

Example pseudo code for replacement logic is listed below. This example code is described along with FIG. 3 below.

```
//Given values; Explanation
//kvps: key-value-pairs (table) containing placeholders and their
replacement-values
//kvp: single key-value-pair in the kvps-loop (e.g. placeholder =
memory and value = 256)
//obj: a concrete data object as instance of any given class
//objProp: current property of properties-loop (e.g. property with
name "directory" of type String and value "/vol1/<sysID>")
//placeholderStart: The marker for starting a placeholder (e.g.
'<')
//placeholderEnd: The marker for ending a placeholder (e.g. '>')
//generics are used here; obj can be any instance of any object
method replacePlaceholders(obj, kvps, placeholderStart,
placeholderEnd)
{
    //generics are used here; loop starts for every obj.properties
    loop obj.properties
    { //if objProp is simple data type continue
      if objProp.dataType is simpleDataType
        { continue; }
      //else objProp is complex data type, meaning contains again an
object or
          a structure within a single property, recursively call this
method with
objProp=obj.properties to loop over the object or components of
structure until objProp has simple data type
      else
{ replacePlaceholders(objProp, kvps, placeholderStart,
placeholderEnd);
          continue; }
      //checks if objProp has replacement marker
      if objProp.hasReplacementMarker( ) is true
        { continue; }
      //else exit the current objProp and take next objProp by
returning to
          loop obj.properties
      else { RETURN; }
      //loop over all placeholders in key-value-list and replace
placeholder in
          Object properties
      loop kvps
      { //only run replacement if placeholders present
          if kvp.contains (placeholderStart) is true
            { continue; }
          //if new value is compatible with properties type, replace
          if objProp.dataType is compatible with kvp.value.dataType
            { placeholderWithSeparators = placeholderStart +
kvp.placeholder +
            placeholderEnd;
            objProp.replace(placeholderWithSeparators, kvp.value); }
        //else log error and skip replacement
          else
  { logError("Value {kvp.value} is not compatible with
{objProp.classType} of
            property {objProp.name}.");
            continue; }
      }
      //next obj.properties is taken
    }
}
```

Figure 3:
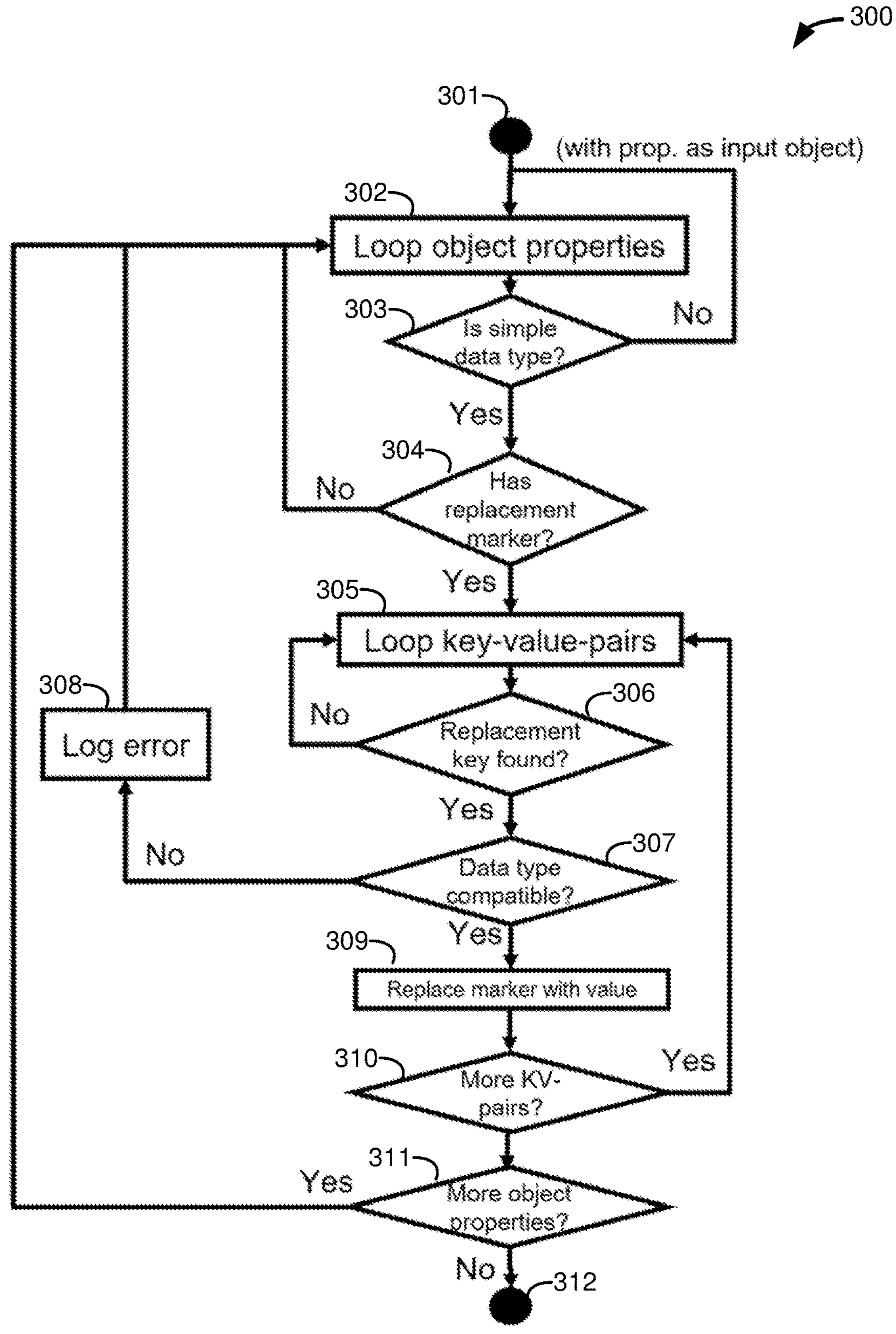
FIG. 3 shows flowchart of dynamic parameter replacement logic, according to an embodiment.

FIG. 3 shows flowchart 300 of dynamic parameter replacement logic, according to an embodiment. The flowchart 300 corresponds to the listing of pseudo code. The pseudo code may be executed by a computer system, such as the one described above with respect to FIG. 1. When referred to the pseudo code, ellipsis ( . . . ) are used to omit certain portions of the code for illustrative purposes.

At 301, the flowchart 300 begins. The flowchart 300 may begin by calling a software method as in the pseudo code:

```
method replacePlaceholders(obj, kvps, placeholderStart,
placeholderEnd)
{
  . . .
}
```

Here, the input “obj” is a concrete data object of any given class. For example, it may be an infrastructure template. The input “kvps” is a key-value-table containing placeholders and their replacement-values. The input “placeholderStart” is a marker for starting a placeholder (e.g. ‘<’). And the input “placeholderEnd” is a marker for ending a placeholder (e.g. ‘>’).

At 302, loop object properties. The pseudo code corresponding to this loop is shown below. Here, “obj” is an object of a generic class (i.e., it is a generic object). That is, object is not a specific type of class at the programmatic (coding) level, but it is a generic object data type at the programming level. This generic object has a set of properties (obj.properties). The loop goes over each property of this set of properties of the object.

```
//generics are used here; loop starts for every obj.properties
  loop obj.properties
  }
    . . .
  }
```

At 303, determine whether the property is a simple data type. If “No,” then return to 301 and then 302 and loop over the object properties for the non-simple (e.g., complex) data type. Pseudo code for this step is given below:

```
loop obj.properties
  { //if objProp is simple data type continue
    if objProp.dataType is simpleDataType
      { continue; }
    //else objProp is complex data type, meaning contains again an
object or a structure within a single property, recursively call
this method with objProp=obj.properties to loop over the object or
components of structure until objProp has simple data type
    else
      { replacePlaceholders(objProp, kvps, placeholderStart,
placeholderEnd);
        continue; }
  . . .
  }
```

At 304, determine if the property has a replacement marker. If “no”, return to 302 and continue with the next object property. If “yes,” continue to 305. The pseudo code corresponding to this step is provided below. These parts are described below.

```
loop obj.properties
  {
    . . .
    //checks if objProp has replacement marker
    if objProp.hasReplacementMarker( ) is true
      { continue; }
    //else exit the current objProp and take next objProp by
returning to loop obj.properties
    else { RETURN; }
```

At 305, loop over the key-value-pairs. The corresponding pseudo code for this loop, which is within the “loop obj.properties” loop, is shown below.

```
loop obj.properties
  {
    . . .
    //loop over all placeholders in key-value-list and replace
placeholder in Object properties
    loop kvps
    { //only run replacement if placeholders present
      if kvp.contains(placeholderStart) is true
        { continue; }
      //if new value is compatible with properties type, replace
      if objProp.dataType is compatible with kvp.value.dataType
        { placeholderWithSeparators = placeholderStart +
kvp.placeholder +
          placeholderEnd;
          objProp.replace(placeholderWithSeparators, kvp.value); }
     //else log error and skip replacement
      else
  { logError("Value {kvp.value} is not compatible with
{objProp.classType} of
          property {objProp.name}.");
          continue; }
    }
    //next obj.properties is taken
  }
```

At 306, determine if a replacement key is found. If “no”, return to 305 and continue to loop over the key-value pairs with the next pair. If “yes,” continue to 307. The corresponding pseudo code is shown below.

```
//only run replacement if placeholders present
  if kvp.contains(placeholderStart) is true
    { continue; }
```

At 307, determine whether the data type is compatible. If “no,” continue to 308 and log the error. If “yes”, continue to 309. The corresponding pseudo code is shown below.

```
//if new value is compatible with properties type, replace
      if objProp.dataType is compatible with kvp.value.dataType
        { placeholderWithSeparators = placeholderStart +
kvp.placeholder + placeholderEnd;
        objProp.replace(placeholderWithSeparators, kvp.value); }
    //else log error and skip replacement
      else
  { logError("Value {kvp.value} is not compatible with
{objProp.classType} of property {objProp.name}.");
        continue; }
```

At 308, log the error. The corresponding pseudo code is shown below.

```
{ logError("Value {kvp.value} is not compatible with
{objProp.classType} of property {objProp.name}.");
  continue; }
```

At 309, replace the markers and placeholder with the value. The corresponding pseudo code is shown below.

```
  { placeholderWithSeparators = placeholderStart +
kvp.placeholder + placeholderEnd;
  objProp.replace(placeholderWithSeparators, kvp.value); }
  continue; }
```

At 310, determine if there are more key-value-pairs. If “yes”, return to 305 and continue to loop over the key-value-pairs from the next key-value-pair. If “no”, continue to 311. The corresponding pseudo code is shown below.

```
loop kvps
  {
    . . .
  }
```

At 311, determine if there are more object properties. If “yes”, return to 302 and continue to loop over the object properties with the next property. If “no” then the flowchart ends at 312. The corresponding pseudo code is shown below.

```
loop obj.properties
{
  loop kvps
  {
    . . .
  }
  //next obj.properties is taken
}
```

By the end 312, all placeholders of the object (obj) will have been replaced according to the mapping of key-value-pairs (kvps).

FIG. 4 shows an illustration 400 of a portion of an example infrastructure template 410 and corresponding infrastructure 420, according to an embodiment. As discussed above, an infrastructure template is an example object that may contain placeholders which may be replaced with values according to the dynamic parameter replacement techniques described herein.

The infrastructure template 410 contains information on volumes, blockdevices, and general (CPU, Operating System, database type, . . . ). It further contains information specifying the volumes, including Volume 1 type, name, and size (411 in FIG. 4), Volume 2 type, name, and size (412 in FIG. 4), and volume 3, type, name, and size (413 in FIG. 4). Further details of the volumes, block devices, and general are not shown in 410 for ease of illustration.

A provisioned computer system 420 with infrastructure according to the infrastructure template 410 is shown in FIG. 4. This system has storage including Volume 1 (421 in FIG. 4), Volume 2 (422 in FIG. 4), and Volume 3 (423 in FIG. 4), as well as block devices. It also includes a database, an operating system/file system, and other components (labeled “ . . . ”).

Volume 1 (421) is provisioned and configured according to the volume 1 information 411 in the infrastructure template 410. Volume 2 (422) is provisioned and configured according to the volume 2 information 412 in the infrastructure template 410. And volume 3 (423) is provisioned and configured according to the volume 3 information 413 in the infrastructure template 410.

In other embodiments, the object containing placeholders to be replaced may be different from an infrastructure template. The object may be a different type of template or it may be a non-template object.

Example Hardware

Figure 5:
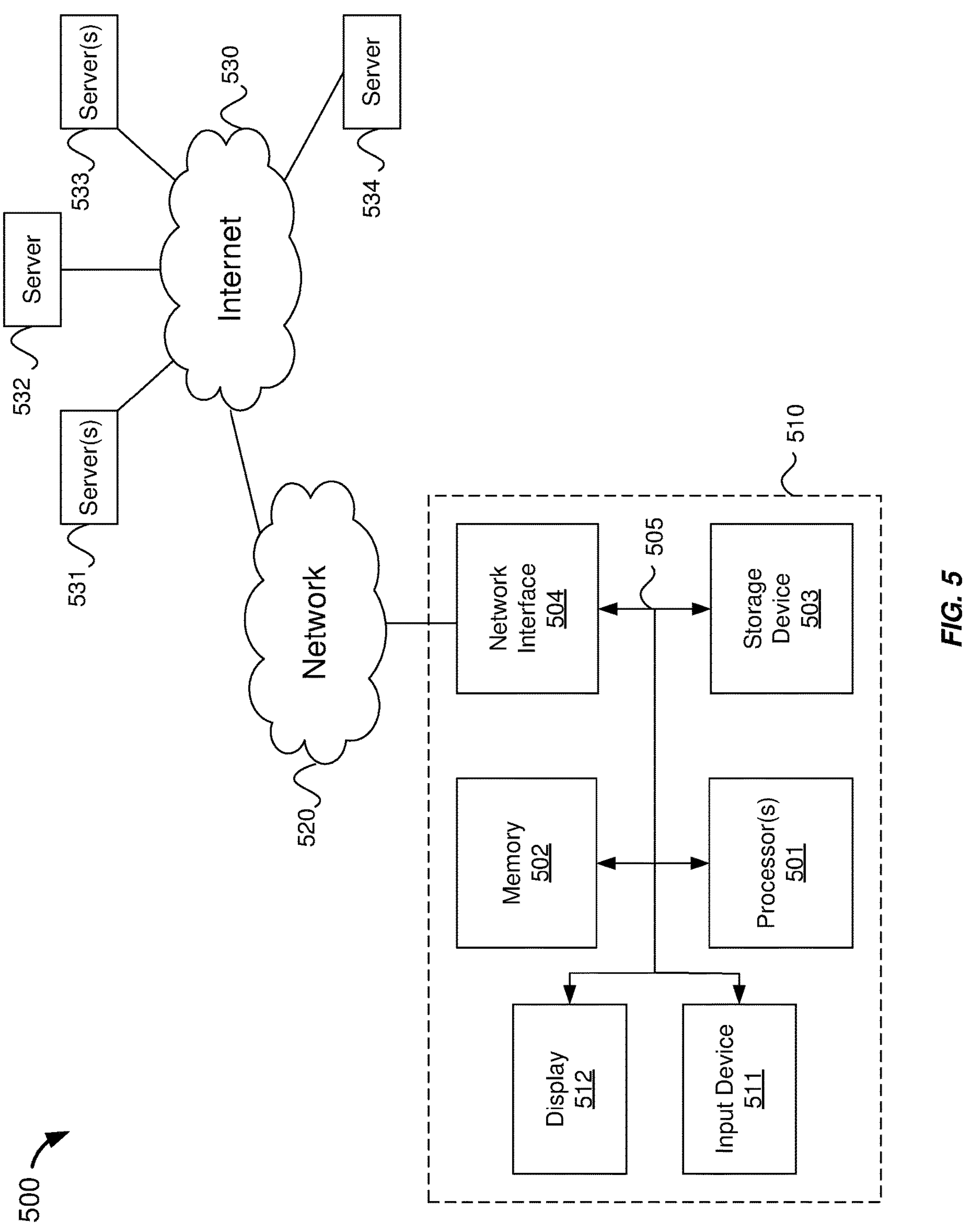
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computer hardware may be used to implement the above described techniques. For instance, the computer system may implement the computer implemented method described.

An example computer system 510 is illustrated in FIG. 5. Computer system 510 includes a bus 505 or other communication mechanism for communicating information, and one or more processor(s) 501 coupled with bus 505 for processing information. Computer system 510 also includes a memory 502 coupled to bus 505 for storing information and instructions to be executed by processor 501, including information and instructions for performing some of the techniques described above, for example. This memory 502 may also be used for storing programs executed by processor(s) 501. Possible implementations of this memory may be, but are not limited to, random access memory (RAM), read only memory (ROM), or both. As such, the memory 502 is a non-transitory computer readable storage medium.

A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums. For example, the storage device 503 may store computer program code including instructions for implementing the method described above with respect to FIG. 2.

Computer system 510 may be coupled using bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

Computer system also includes a network interface 504 coupled with bus 505. Network interface 504 may provide two-way data communication between computer system 510 and a network 520. The network interface 504 may be a wireless or wired connection, for example. Computer system 510 can send and receive information through the network interface 504 across a local area network, an Intranet, a cellular network, or the Internet, for example. In the Internet example, a browser, for example, may access data and features on backend systems that may reside on multiple different hardware servers 531, 532, 533, 534 across the network. The servers 531-534 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:

one or more processors; and one or more machine-readable medium coupled to the one or more processors and storing computer program code comprising sets of instructions executable by the one or more processors to:

obtain an infrastructure template for provisioning physical or virtual computer systems, the infrastructure template including a plurality of properties, the plurality of properties including a plurality of placeholders, wherein each particular placeholder of the plurality of placeholders is a portion of a particular value of a particular property;

obtain a parameter-property mapping including a plurality of key-value pairs, each key value pair including a property key and a property value;

responsive to a property of the infrastructure template being a complex object, recursively transverse properties of the complex object using class-level generic inspection independent of a predefined object type;

responsive to a datatype of a replacement value associated with a key-value pair being compatible with a datatype associated with the property of the infrastructure template containing a placeholder value contained within the properties of the complex object, replace the placeholder value with a replacement value;

generate an infrastructure object comprising the replaced placeholder value; and provision a computer infrastructure according to the generated infrastructure object, wherein the recursive traversal is performed independently of modifications to a class definition of the infrastructure template such that additional properties may be added to the infrastructure template without modifying program code used to traverse the infrastructure template.

2. The computer system of claim 1, wherein using generic classes is performed independent of possible changes in a class of the infrastructure template enabling properties to be added or changed without changing the sets of instructions for iteratively looping over each of the plurality of properties of the infrastructure template.

3. The computer system of claim 2, wherein the generic classes read data at a class level such that a data type of each placeholder is not predetermined.

4. The computer system of claim 1, wherein the parameter-property mapping is a JavaScript Object Notation object.

5. The computer system of claim 1, wherein the infrastructure template is a template containing data of various setups or configurations of computer systems including one or more of volume size, volume types, block devices, file system, directories, and mount points.

6. A non-transitory computer-readable medium storing computer program code comprising sets of instructions to:

obtain an infrastructure template for provisioning physical or virtual computer systems, the infrastructure template including a plurality of properties, the plurality of properties including a plurality of placeholders, wherein each particular placeholder of the plurality of placeholders is a portion of a particular value of a particular property;

obtain a parameter-property mapping including a plurality of key-value pairs, each key value pair including a property key and a property value;

responsive to a property of the infrastructure template being a complex object, recursively transverse properties of the complex object using class-level generic inspection independent of a predefined object type;

responsive to a datatype of a replacement value associated with a key-value pair being compatible with a datatype associated with the property of the infrastructure template containing a placeholder value contained within the properties of the complex object, replace the placeholder value with a replacement value;

generate an infrastructure object comprising the replaced placeholder value; and provision a computer infrastructure according to the generated infrastructure object, wherein the recursive traversal is performed independently of modifications to a class definition of the infrastructure template such that additional properties may be added to the infrastructure template without modifying program code used to traverse the infrastructure template.

7. The non-transitory computer-readable medium of claim 6, wherein using generic classes is performed independent of possible changes in class of the infrastructure template, enabling properties to be added or changed without changing the sets of instructions for iteratively looping over each of the plurality of properties of the infrastructure template.

8. The non-transitory computer-readable medium of claim 7, wherein the generic classes read data at a class level such that a data type of each placeholder is not predetermined.

9. The non-transitory computer-readable medium of claim 6, wherein the parameter-property mapping is a JavaScript Object Notation object.

10. The non-transitory computer-readable medium of claim 6, wherein the infrastructure template is a template containing data of various setups or configurations of computer systems including one or more of volume size, volume types, block devices, file system, directories, and mount points.

11. A computer-implemented method, comprising:

obtain an infrastructure template for provisioning physical or virtual computer systems, the infrastructure template including a plurality of properties, the plurality of properties including a plurality of placeholders, wherein each particular placeholder of the plurality of placeholders is a portion of a particular value of a particular property;

obtain a parameter-property mapping including a plurality of key-value pairs, each key value pair including a property key and a property value;

responsive to a property of the infrastructure template being a complex object, recursively transverse properties of the complex object using class-level generic inspection independent of a predefined object type;

responsive to a datatype of a replacement value associated with a key-value pair being compatible with a datatype associated with the property of the infrastructure template containing a placeholder value contained within the properties of the complex object, replace the placeholder value with a replacement value;

generate an infrastructure object comprising the replaced placeholder value; and provision a computer infrastructure according to the generated infrastructure object, wherein the recursive traversal is performed independently of modifications to a class definition of the infrastructure template such that additional properties may be added to the infrastructure template without modifying program code used to traverse the infrastructure template.

12. The computer-implemented method of claim 11, wherein using generic classes is performed independent of possible changes in a class of the infrastructure template, enabling properties to be added or changed without changing instructions for looping over each of the plurality of properties of the infrastructure template.

13. The computer-implemented method of claim 12, wherein the generic classes read data at a class level such that a data type of each placeholder is not predetermined.

14. The computer-implemented method of claim 11, wherein the infrastructure template is a template containing data of various setups or configurations of computer systems including one or more of volume size, volume types, block devices, file system, directories, and mount points.

* * * * *